Jan. 13, 1970   L. C. BROWN   3,489,901
METHOD AND APPARATUS FOR RADIATION MEASURING THE
MASS OF MATERIAL HAVING A SPATIALLY NON-UNIFORM
MASS DISTRIBUTION
Filed Dec. 27, 1965   2 Sheets-Sheet 1

INVENTOR
LEONARD C. BROWN

BY Cushman, Darby & Cushman
ATTORNEYS

INVENTOR
LEONARD C. BROWN
BY Cushman, Darby & Cushman
ATTORNEYS

United States Patent Office 3,489,901
Patented Jan. 13, 1970

3,489,901
METHOD AND APPARATUS FOR RADIATION MEASURING THE MASS OF MATERIAL HAVING A SPATIALLY NON-UNIFORM MASS DISTRIBUTION
Leonard C. Brown, Columbus, Ohio, assignor to Industrial Nucleonics Corporation, a corporation of Ohio
Filed Dec. 27, 1965, Ser. No. 516,636
Int. Cl. G01t 1/16; H01j 39/00
U.S. Cl. 250—83.3       10 Claims

ABSTRACT OF THE DISCLOSURE

The following specification discloses method and apparatus for measuring the mass or some related parameter of material having a spatially non-uniform distribution of that parameter. A plurality of independent radiation detectors are provided to generate output signals indicative of the parameter at different sections of the material being radiated. The signals are each logarithmically processed and then summed to produce an output signal representative of the measurement of the parameter. The number of detectors employed is such that the effect of space, density or mass absorption coefficient variations are substantially eliminated.

---

This invention relates to a radiation method and apparatus for measuring the mass or some other related parameter of a material having a spatially non-uniform mass distribution. More particularly, this invention relates to a radiation method and apparatus for accurately determining mass in spite of variations of the shape, mass absorption coefficient, or density of the material with respect to the spatial coordinates of the material. One area in which this invention has utility is where the mass of a sheet of moving material is continuously determined by passing the material between a strip source of nucleonic radiation and a corresponding strip detector thereof, the detector output being representative of the mass. However, the mass determination made by such devices results in inaccurate determinations. These inaccuracies arise mainly because of variations in the thickness, density, or mass absorption coefficient of the material transverse to the lengthwise axis of the sheet passing between the strip source and detector. Strip radiation sources and detectors are used, both of which are disposed adjacent to the sheet and transverse to the lengthwise axis thereof. Any variations in the above-mentioned parameters of the material transverse to the lengthwise axis, will result in errors in the output signal since the detector linearly responds to the various signals presented across the sheet and then linearly sums all of these contributions to the mass determination made across the sheet. The linear response of the detector together with the linear summation introduces inaccuracies since the radiation sensed by the detector is exponentially dependent on the mass of the sheet material as opposed to linearly dependent thereon.

The present invention may also be applied to the plurality of tanks where there may be variations of the mass in such a way as to also utilize the teachings of this invention.

Accordingly, it is an object of this invention to provide an improved radiation method and apparatus for accurately measuring the mass or some related parameter of a material having a spatially non-uniform mass.

It is another object of this invention to provide an improved method and apparatus for logarithmetically processing a radiated signal transmitted through a sheet of material to thereby improve mass measurements made on the material.

It is another object of this invention to provide an improved method and apparatus for measuring the mass of a sheet of material having a varying mass profile or cross-section transverse to the lengthwise axis of the sheet.

It is another object of this invention to provide an improved method and apparatus for accurately determining the mass of a sheet of material having a mass absorption coefficient or density which varies with respect to a direction transverse to the lengthwise axis of the sheet.

Other objects and advantages of this invention will become apparent to those of ordinary skill in the art upon reading the appended claims and the following detailed description of an illustrative embodiment of the invention, in conjunction with the drawings, in which:

First, a brief description will be given of the inherent shortcomings of prior art approaches to the problem of determining the mass of a sheet of moving material having a non-uniform distribution of mass with respect to a direction transverse to the lengthwise axis of the sheet.

Normally a strip source of nuclear radiation (beta or gamma) is collimated to form a unidirectional sheet of flux of widths a (which is effectively the width of the sheet) and thickness c and a strip detector, parallel to the strip source, is arranged to receive the radiation. A continuously moving mass of material passing between the source and detector will absorb part of the radiation flux and cause a reduction in flux incident on the detector resulting in a detector output related to the mass per unit length in the moving material. Because of the exponential dependence of the transmitted radiation on the quantity of intervening mass, the actual relation between the detector output and intervening mass is not a simple one. In particular, an additional layer of mass which increases the depth of material in the direction of radiation causes a different (smaller) effect per unit mass than a corresponding increase in width of the intervening mass. A single strip detector integrates the current contributions in a linear fashion whether because of an increased thickness or an increased width of material thus introducing errors in the output which are dependent on the cross-sectional shape of the intervening mass.

The theoretical considerations establishing the techniques employed by the instant invention will now be discussed.

Figure 1:
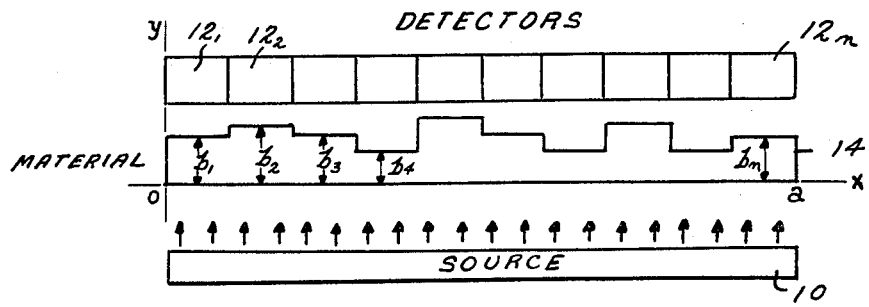
FIGURE 1 is an arrangement which diagrammatically shows an idealized sheet of material having a non-uniform distribution of mass.

Reference should now be made to FIGURE 1 which diagrammatically shows an idealized sheet of material having a non-uniform distribution of mass. An essentially unidirectional sheet of radiation of width $a$ and thickness $c$ is provided by a strip source 10 of nucleonic, which may be beta, gamma or other well known types. The detection system is composed of a set of $n$ independent detectors $12_1$–$12_n$ rather than a single long strip detector. These detectors are placed side by side to form a strip of multiple detectors as shown in FIGURE 1. Both source and detectors are collimated (not shown in FIGURE 1) to transmit and receive only radiation which is unidirectional in the $y$ direction. The current output $I_n$ of each detector is assumed to be a linear function of the incident flux $F_n$ on that detector.

An idealized distribution of intervening mass 14 is shown in FIGURE 1. Beneath each detector is found a mass of uniform density, composition and height, but the height varies from detector to detector and is given by $b_1, b_2 \ldots b_{10}$. If the radiation is reasonably well collimated, both at the source and detector, the effects of secondary or scattered radiation are considerably reduced thus insuring the validity of the law of exponential decay of transmitted radiation, i.e., the effects of "build-up" which modify the exponential law are minimized.

Figure 2:
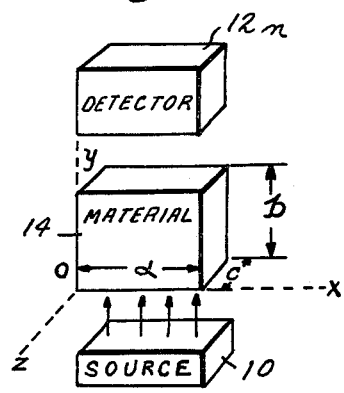
FIGURE 2 is a detailed diagrammatic illustration of a typical cell or subdivision of the sheet of material shown in FIGURE 1.

Referring to FIGURE 2, consider a single one of the sections or "cells" shown in FIGURE 1. To a good approximation the flux received by the associated detector is governed by the absorption in the material of that one cell (assuming unidirectional collimation).

In FIGURE 2, only that part of the material and source flux is shown that affects the signal in the $n$th detector cell $12_n$. The dimensions of the cell are determined by the width and thickness of the detector cell and the thickness of the sheet of radiation. The sharpness of the cell boundaries in the material depend to a considerable extent on the degree of collimation both at the source and at the detector. The $z$ direction is taken to be along the path of the moving material. The total width of the sheet ($x$ direction) is $n\alpha = a$ made up of $n$ cells. The depth or height of the intervening absorbing material, $b$, is of course determined by the quantity of material under the gauge at the $n$th detector. The thickness of the cell in the $z$ direction is $c$. The depth is assumed for the present to be uniform over the area of the cell.

The flux $F_n$ received by the detector $12_n$ is given by $$F_n = \alpha c I_0 e^{-\mu b_n \rho} \qquad (1)$$

where $I_0$ is the incident flux density (assumed uniform over all detector positions). The mass absorption coefficient $\mu$ and the mass density $\rho$ are assumed to be uniform for the present. Hereinafter, $\mu$, $\rho$, and $b_n$ are allowed to vary over the dimensions of a single cell.

It is convenient to modify the form of Equation 1 in order to reveal more clearly the relation between intervening mass/unit length (in the $z$ direction) and the detector signal. The exponent $\mu \rho b_n$ can be written as $b_n/\lambda$ where $\lambda = 1/\mu\rho$ is the characteristic mean-free-path of the radiation in the given material. Also $$\frac{b_n}{\lambda} = \frac{\alpha c \rho b_n}{\alpha c \rho \lambda} = \frac{M_n'}{M_\lambda'} \qquad (2)$$

where $M_n'$ = mass of material in the cell of dimensions $\alpha$, $b_n$, $c$ and density $\rho$, and $M_\lambda'$ is the mass that would be in the same cell if the depth of material were $\lambda$, i.e., $M_\lambda' = \alpha \lambda c \rho$ = one characteristic mass of depth one characteristic length $\lambda$, a convenient constant reference mass.

If both numerator and denominator of Equation 2 (second member) are divided by $c$, the thickness of the cell in the $z$ direction (direction of motion of material), Equation 2 can be written as $$\frac{b_n}{\lambda} = \frac{\alpha \rho b_n}{\alpha \rho \lambda} = \frac{M_n}{M_\lambda} \qquad (3)$$

where $M_n$ is the mass per unit length in $z$ direction in the $n$th cell and $M_\lambda$ is the corresponding mass per unit length of material of depth $\lambda$, i.e., the characteristic mass per unit length per cell width $\alpha$. Finally, if the ratio $M_n/M_\lambda$ is defined as $m_n$ then $$m_n = \frac{M_n}{M_\lambda} = \frac{b_n}{\lambda} = \mu b_n \rho \qquad (4)$$

and the quantity $m_n$ can be viewed as the mass of material per unit length in units of one characteristic mass per unit length $M_\lambda = \alpha \rho \lambda = \alpha/\mu$ within a cell of width $\alpha$. The constancy of $M_\lambda$ thus depends on the constancy of the $\mu$ of the material.

In terms of $m_n$, Equation 1 becomes $$F_n = \alpha c I_0 e^{-m_n}$$

or $$F_n = F_0 e^{-m_n} \qquad (5)$$

where $F_0$ is the flux on the detector in the absence of intervening mass (other than constant masses such as conveyor belts, tube walls, etc.).

A relative flux can be defined as $F_n/F_0$ and, if the detector output signal is linear with detected flux, a relative output signal $S_n$ can be developed such that $$S_n = e^{-m_n} \qquad (6)$$

thus $S_n = 1$ for zero relative mass/length; $S_n = e^{-1}$ for one characteristic mass/length; $S_n = e^{-2}$ for two characteristic masses/length, etc.

If a single long detector of the prior art is utilized, rather than $n$ individual detectors, the output signal is equivalent to $S_1 + S_2 + \ldots + S_n$ because of the linear nature of the detector, e.g., each region in a long ionization chamber contributes to the total signal output in proportion to the flux entering that region (assuming linear operation). From Equation 6 it is readily seen that the linear sum signal is $$S = S_1 + S_2 + \ldots + S_n$$
$$= e^{-m_1} + e^{-m_2} + \ldots + e^{-m_n}, \qquad (7)$$

which is not related to the total mass per unit length $$m = m_1 + m_2 + \ldots + m_n \qquad (8)$$

over all $n$ cells, in any manner that can be called simple. If the material depth in the various cells is relatively uniform, so that $m_1 \cong m_2 \ldots \cong m_n$, then a rough approximation in the form $S \cong K e^{-m}$ results, however, for non-equal depths this expression must be replaced by $S = K(m_1, m_2 \ldots m_n) e^{-m}$ where the factor $K$ is a shape factor depending upon the actual profile of the material under the detector, i.e., $K$ is a variable depending on cross-section shape. If it were not for this variable factor it would be possible to pass $S$ through a logarithmic amplifier and obtain a final output signal proportional to $m$, the mass/length (in units of $M_\lambda$). In situations where the factor $K$ can be assumed to be essentially constant, because of known system geometry, this technique may be used with reasonable accuracy.

In contrast, if the shape of the mass or the mass profile varies, the above techniques may not be adequate. A signal of considerably greater accuracy can be obtained, however, by the use of the multi-detector unit shown in FIGURE 3. A separate logarithmic amplifier $16_1$–$16_n$ is provided for each individual detector. The several detectors preferably have matched characteristics as well as the several logarithmic amplifiers. Each relative signal $S_1, S_2 \ldots S_n$ is passed through a separate logarithmic amplifier that is $$\ln S_n = -m_n \qquad (9)$$

and then the output signals from the logarithmic amplifiers $12_1$–$12_n$ are added in summing means 18 to obtain the desired mass measurement—that is, $$m = -(\ln S_1 + \ln S_2 + \ldots + \ln S_n) \qquad (10)$$
$$= -\Sigma_n \ln S_n$$

(since each $S_n$ is less than unity the $\ln S_n$ is negative and the expression for $m$ is positive).

Equation 10 shows that an analytically exact relation for the mass/length is available, for the case of a step mass profile. Collimators $20_1$–$20_n$ and $22_1$–$22_n$ respectively provide the desired collimation of the source 10 and the detectors $12_1$–$12_n$.

There are several sources of error which would tend to cause deviations from Equation 10 in a working device:

(1) Variations in individual detector characteristics especially in zero-drift, sensitivity (gain and linearity).

(2) Variations in individual logarithmic amplifier-zero-drift, gain, and deviation from logarithmic response.

(3) Cross-talk between neighboring cells because of inadequate unidirectional collimation of the radiation.

(4) Deviation of the mass profile from the step-profile shown in FIGURE 1 (an estimate of the magnitude of this type of error is made in the next section).

(5) Variations in the mass absorption coefficient $\mu$.

The first three categories mentioned above are considerations that are controllable with presently available equipment.

The last two considerations will be discussed hereinafter.

It should be noted that errors due to mass profile or shape deviations (see category 4 above) can be made arbitrarily small by choosing a source of radiation such that the ratio of $\alpha$, the width of a single cell or section of the sheet (see FIGURE 1) to $\lambda$, the characteristic mean-free-path of the radiation in the given material, is quite small.

The above results from the fact that the amount of deviation can be shown to be a direct function of the square of $\alpha$ to $\lambda$ ratio and the mean-square slope averaged over $n$ cells, $$\overline{\beta_n^2}.$$

Figure 4:
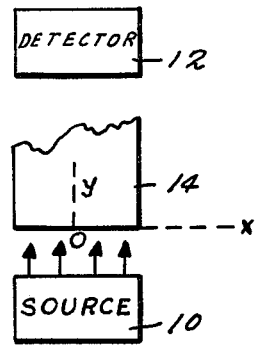
FIGURE 4 is a diagrammatic detail of a typical subdivision of a sheet having an arbitrary mass profile.
Figure 5:
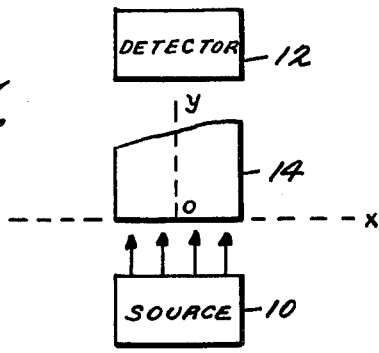
FIGURE 5 is a diagrammatic illustration of a typical cell or subdivision of the invention which geometrically approximates the subdivision shown in FIGURE 3.

For an explanation of $\beta_n$, see FIGURES 4 and 5, where FIGURE 4 shows a single cell with a varying mass profile and FIGURE 5 shows an equivalent cell formed by figuratively interchanging the relative positions of "slices" of material orthogonal to the $x$ direction. The curvature of the equivalent profile is typically small and may be ignored. $\beta_n$ is the average slope of the profile over the cell interval. Therefore, $$\overline{\beta_n^2}$$

is the mean value of the square of the slopes of each of the $n$ cells.

Typically $\beta_n = 1$ at the most and since the expression for the deviation term due to variation of the mass profile from the step-profile shown in FIGURE 1 (see category 4) is defined by the following expression $$\frac{1}{24}\left(\frac{\alpha}{\lambda}\right)^2 \overline{\beta_n^2} \qquad (11)$$

it can be seen that typically the variation caused by this shape dependent deviation can be kept quite small by keeping the $\alpha/\lambda$ ratio small—that is one or less.

The cell width, $\alpha$, is a function of the total number of detectors $12_1$–$12_n$ employed together with the width and size of the individual detectors. The more detectors of small width used, the smaller $\alpha$ will be.

It must be emphasized that the error defined by the expression (11) is typically quite small, the significant errors having been eliminated by the provision of the separate detectors $12_1$–$12_n$ together with corresponding logarithmic amplifiers $16_1$–$16_n$. Normally the remaining small error evidenced by expression (11) can be eliminated by calibrating or adjusting the output indication device 26 or the attenuator 24 described hereinafter.

When severe surface irregularities or inhomogeneous density stratifications occur within the material, the correction must set at some mid-point where such irregularities would have a minimum effect on the accuracy of the system.

The number of detectors may be a function of the material whose mass is being measured. In some, a prior knowledge is available as to the mass distribution within the material, it may be possible to position detectors relatively far apart and employ statistical information about the material in determining the mass of the material.

An attenuator 24 is optionally available to provide mass measurement in terms of the mass per unit length (in the $z$ direction) with depth $\lambda$ over the full width $a$ of the sheet of material. The attenuator 24 divides the output from summing means 18 by $n$, the number of detectors, this attenuation typically being provided by a potentiometer divider.

If the mass density $\rho$ is permitted to vary over a given cell, considerations arise similar to those analyzed for shape deviations from the standard shape. Therefore, density variations within a given cell also have a typically very limited effect on the output mass measurement. This follows since shape deviations of a given cell with respect to a standard shape (for instance, the step profile shown in FIGURE 1) have a similar effect on the amount of flux passed by the material as do density deviations of the cell with respect to a constant density condition.

The reasoning of the last paragraph also applies to the deviation of the mass absorption coefficient over a given cell.

Thus, it can be seen that the variations of the parameters of shape, density, and mass absorption coefficient (which normally effect mass measurement by a radiation method) over a single cell generally have a very limited effect on the mass measurement when an appropriate number of detectors of suitable width is chosen to implement the system.

In the case of a varying mass absorption coefficient over a single cell it should be noted that the magnitude of $M\lambda = a/\mu$ and of $M_0 = a/\mu$ will vary with changes in the average $\mu$. This constitutes an additional error in the system "read-out" in direct proportion to the variation in $\mu$ (since the "read-out" is measured in units of $M_0$, the system calibration will change with a change in $\mu$. If the time average of $\mu$ is reasonably constant, however, the time average "read-out" will be correspondingly constant.

Thus a mass gauge system exhibiting essentially linear overall characteristics has been described.

It will be apparent that the same linear response is made to variations occurring in time along the $z$ direction (see FIG. 2), i.e. in the direction the material is moving. An individual detector-amplifier, say $12_2$–$16_2$, will provide a linear response to mass changes in this direction that pass adjacent to source 2 and collimator $20_2$.

Figure 3:
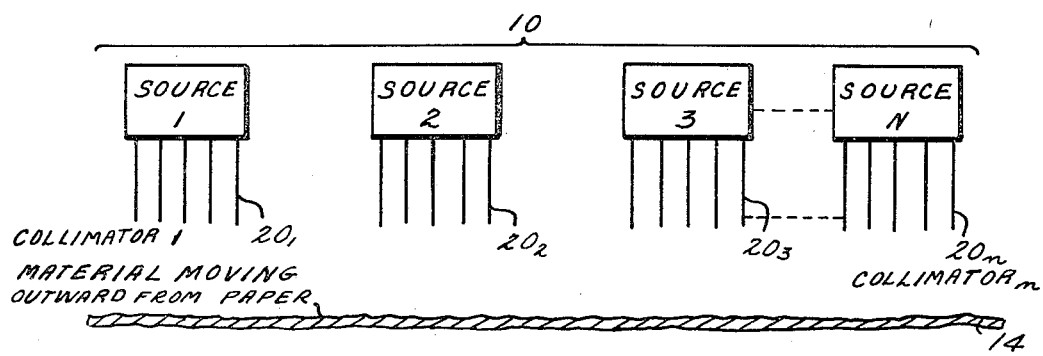
FIGURE 3 is a diagrammatic showing of an illustrative embodiment of the invention.
Figure 3:
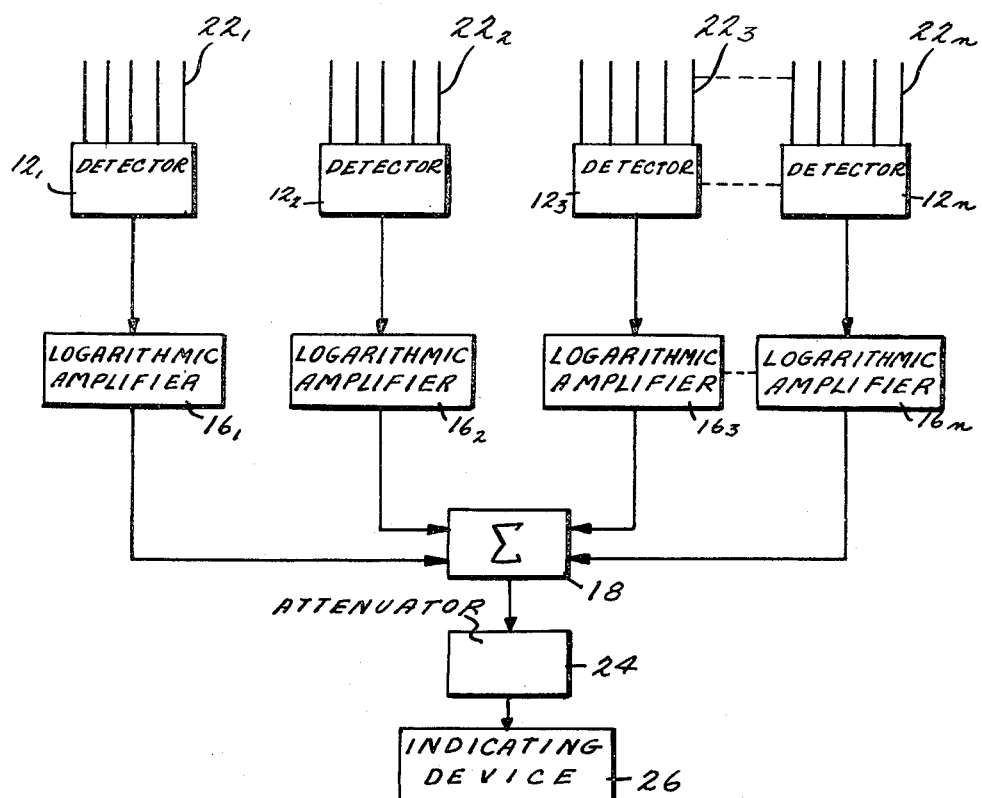

The apparatus shown in FIGURE 3 for measuring mass or some related parameter of the material having a spatially non-uniform distribution of the parameter comprises means (radiation source 10 and lenses or collimators $20_1$ through $20_n$) for transmitting a plurality of signals (or beams of nucleonic radiation) through different sections of the material (as evidenced in FIGURE 1); a plurality of means (the detectors $12_1$ through $12_n$, the collimators $22_1$ through $22_n$ and the logarithmic amplifiers $16_1$–$16_n$) which are respectively responsive to the transmitted signals for respectively developing a plurality of output signals at the outputs of the logarithmic amplifiers $16_1$ through $16_n$, each output signal being a logarithmic function of its associated transmitted signal; means (summer 18) for summing the output signals to develop a signal representative of the measurement of the above-mentioned parameter.

Thus, the basic invention has been above described. Various means will occur to those skilled in the art to implement the logarithmic processing of the plurality of signals radiated through the measured material. However, it is within the scope of this invention to cover all such methods of accomplishing logarithmic processing. Further, other detailed functions of this invention (such as the generation of a plurality of radiated beams and direction of these beams to different sections of the measured material or the summation of all of the processed signals) may be performed by various means known to people skilled in the art.

What is claimed is:

1. Apparatus for measuring the mass or some related parameter of material having a spatially non-uniform distribution of said parameter comprising:
   means for transmitting a plurality of signal through different sections of said material;
   a plurality of means respectively responsive to said transmitted signals for respectively developing a plurality of output signals, each output signal being a logarithmic function of its associated transmitted signal; and
   means for summing said output signal to develop a signal representative of the measurement of said parameter.

2. Apparatus as in claim 1 where said logarithmic output signal developing means includes a plurality of linear detectors respectively responsive to said transmitted signals and a plurality of logarithmic amplifiers respectively responsive to said detectors for developing said output signals.

3. Apparatus as in claim 2 where said linear detectors all have the same characteristics and said logarithmic amplifiers all have the same characteristics.

4. Apparatus as in claim 2 wherein said signal transmitting means includes a plurality of nucleonic radiation sources respectively associated with said detectors and radiation collimating means between said sources and detectors for preventing radiation cross-talk therebetween.

5. Apparatus as in claim 1 including means responsive to said signal representative of said parameter measurement for adjusting the value of said representative signal so that errors caused by severe irregularities of the material being measured may be compensated for.

6. Apparatus as in claim 1 where said signal transmitting means includes a plurality of collimated nucleonic radiation sources respectively associated with said linear detectors.

7. Apparatus as in claim 6 where said material is a sheet and said nucleonic radiation sources are disposed adjacent to one side of said sheet and in a row transverse to the lengthwise axis thereof, said detectors being disposed adjacent the other side of said sheet and being collimated to respectively receive the beams radiated by said sources.

8. Apparatus as in claim 7 where the ratio of the width in said transverse direction of each said sections of the material to the characteristic mean-free-path of said radiation in said material is substantially one or less thereby substantially eliminating effect of shape, density, or mass absorption coefficient variations over one of said sections on said material.

9. Apparatus as in claim 7 including attenuating means responsive to the signal developed by said summing means to provide a mass measurement in terms of the mass per unit length with respect to said lengthwise axis, said unit length mass having a depth substantially equal to the characteristic mean-free-path of said radiation in the material and a width substantially equal to the width of said sheet.

10. Apparatus for measuring the mass or some related parameter of a sheet of material having a lengthwise axis comprising:
   radiation means, disposed adjacent one side of said material and transverse to the lengthwise axis thereof, for directing radiation at different sections of said sheet of material;
   a plurality of detector means, responsive to said radiation means and disposed on the side opposite said one side;
   a plurality of means for respectively logarithmically amplifying the outputs from said detectors; and
   means for summing the logarithmically amplified signals to obtain the measurement of said parameter.

References Cited

UNITED STATES PATENTS

| | | |
|---|---|---|
| 3,082,323 | 3/1963 | Chope et al. |
| 3,087,061 | 4/1963 | Dukes et al. _____ 250—83.3 X |
| 3,132,247 | 5/1964 | Wright. |
| 3,197,638 | 7/1965 | Sinclair. |
| 3,234,384 | 2/1966 | Friedling et al. _____ 250—83.1 |
| 3,016,460 | 1/1962 | Andresen. |

ARCHIE R. BORCHELT, Primary Examiner

U.S. Cl. X.R.

250—43.5

UNITED STATES PATENT OFFICE
CERTIFICATE OF CORRECTION

Patent No. 3,489,901         Dated January 13, 1970

Inventor(s) Leonard C. Brown

It is certified that error appears in the above-identified patent and that said Letters Patent are hereby corrected as shown below:

Column 1, line 60, after the phrase "applied to the", insert -- measurement of fuel in a tank or a --.

Column 2, line 37, "widths" should read -- width --; line 64, after "nucleonic", insert -- radiation --.

Column 3, line 38, in the right side of Equation (1), "$e^{-\mu b_n \rho}$" should read -- $e^{-\mu b_n \rho}$ -- so that $\rho$ does not appear as a subscript to $b_n$; lines 52 and 53, in Equation (2), "$\frac{M_n'}{M_\lambda'}$" should read -- $\frac{M_n'}{M_\lambda'}$ --; lines 63 and 64, in Equation (3), "$\frac{M_n}{M_\lambda}$" should read -- $\frac{M_n}{M_\lambda}$ --; lines 72 and 73, in Equation (4) "$\frac{M_n}{M_\lambda}$" should read -- $\frac{M_n}{M_\lambda}$ --.

Column 4, line 46, "$M\lambda$" should read -- $M_\lambda$ --.

Column 6, line 32, "$M\lambda = a/\mu$" should read -- $M_\lambda = a/\bar{\mu}$ --; "$M_o = a/\mu$" should read -- $M_o = a/\bar{\mu}$ --; lines 35, 36, and 37, "$\mu$" should read -- $\bar{\mu}$ --.

Claim 6, Column 7, line 41, "claim 1" should read -- claim 2 --.

Signed and sealed this 7th day of March 1972.

(SEAL)
Attest:

EDWARD M. FLETCHER, JR.
Attesting Officer

ROBERT GOTTSCHALK
Commissioner of Patent